UNITED STATES PATENT OFFICE.

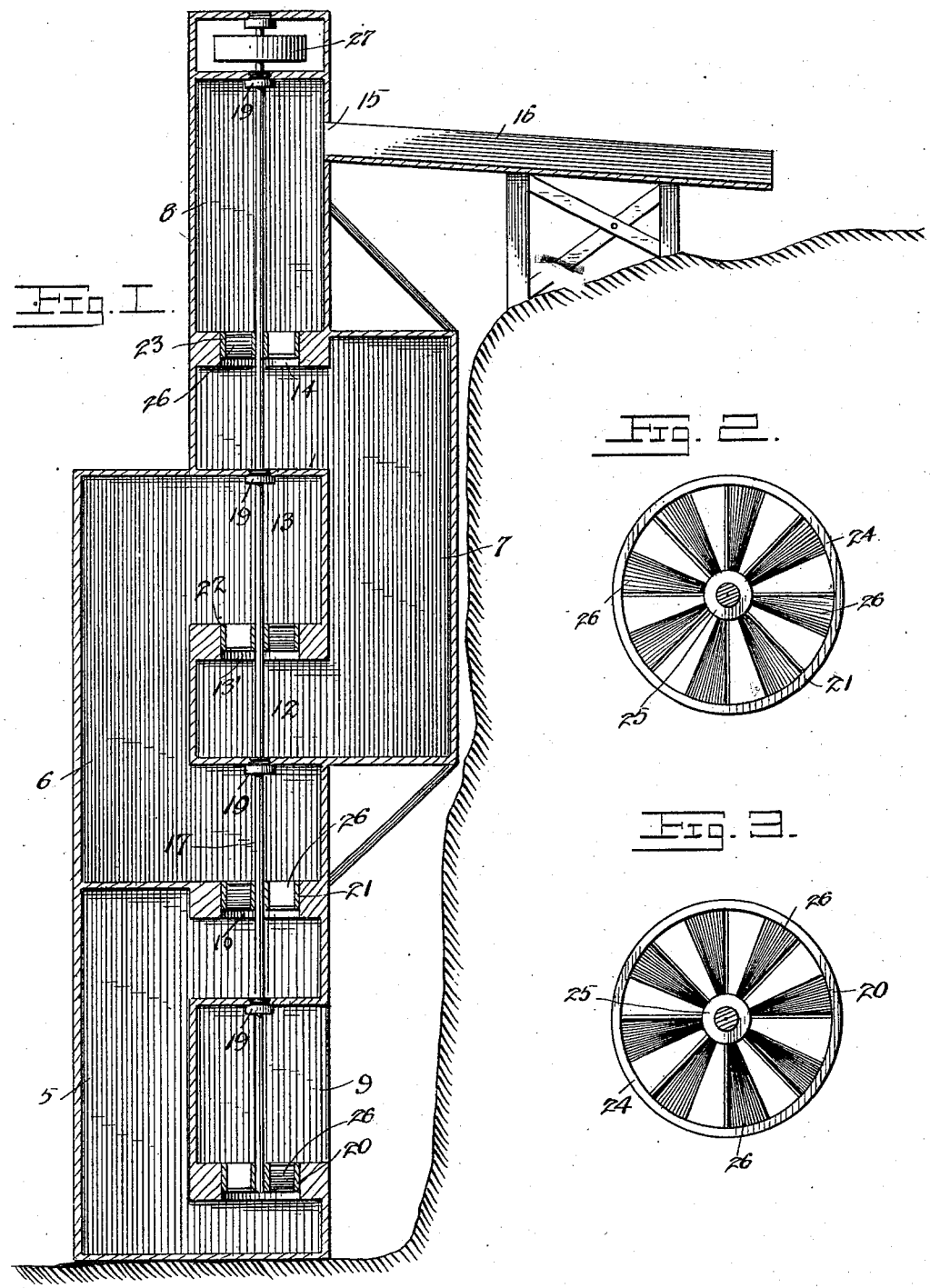

JOSHEPH W. BAKER, OF ANGLETON, TEXAS.

PUMP.

SPECIFICATION forming part of Letters Patent No. 684,970, dated October 22, 1901.

Application filed May 17, 1901. Serial No. 60,731. (No model.)

*To all whom it may concern:*

Be it known that I, JOSHEPH W. BAKER, a citizen of the United States, residing at Angleton, in the county of Brazoria and State of Texas, have invented a new and useful Pump, of which the following is a specification.

This invention relates to pumps, and more particularly to rotary pumps; and it has for its object to provide a device of this nature wherein a series of lifting-wheels are mounted upon a common shaft and lift the water in steps and in such manner that the thrust of each wheel is approximately counterbalanced by the oppositely-directed thrust of an adjacent wheel, and hence the thrust in either direction of the shaft is diminished to a minimum.

In the drawings forming a portion of this specification, and in which like numerals of reference indicate similar parts in the several views, Figure 1 is a view partly in section and partly in elevation and showing a pump constructed in accordance with the present invention and disposed to raise water from a stream to the top of the bank, as in irrigating. Fig. 2 is a top plan view of one of the pumping-wheels, the shaft being in section. Fig. 3 is a top plan view of an opposing wheel, the shaft being in section.

Referring now to the drawings, the barrel of the pump comprises a plurality of water-chambers 5, 6, 7, and 8, of which the lower chamber 5 has a cylindrical inlet-opening 9, through which the water must pass downwardly into the chamber, while at the top of the chamber 5 is an inlet 10 for the second chamber 6 and through which the water must pass in an upward direction to said chamber 6. The third chamber 7 projects at its lower end into the side of the chamber 6, as shown at 12, and between this portion 12 and the corresponding portion 13 of the chamber 6 which projects into the side of the chamber 7 is an inlet-opening 13' for the chamber 7 and through which the water must pass in a downward direction to the chamber 7. At the upper end of the chamber 7 is an inlet 14 for the uppermost chamber 8, and in the side of the chamber 8 and near to the top thereof is an outlet-opening 15, through which the water may be discharged to a trough 16.

As shown in the drawings, the several inlet-openings for the separate water-chambers are in axial alinement, and they are all cylindrical, and passed centrally through these openings and vertically is a pump-shaft 17, having bearings in stuffing-boxes 19 in the walls of the separate chambers, the stuffing-boxes preventing backward flow of water from one chamber to the chamber therebelow.

It will be noted that the water in passing from the bottom to the top of the pump-barrel passes first downwardly into the lowermost chamber 5, then upwardly into the chamber 6, then downwardly into the chamber 7, and finally upwardly into the chamber 8, so that it flows through the several inlet-openings alternately in opposite directions. To force the water first downwardly, then upwardly, then downwardly, and finally upwardly, a series of pumping-wheels 20, 21, 22, and 23 are provided and are fixed upon the shaft 17, so as to fit in the cylindrical inlet-openings of the several chambers, the walls of the chambers being thickened or otherwise formed at these points to give a length to the wall of each opening somewhat more than the length of the wheel therein.

Each of the wheels consists of a band or rim 24 and a hub 25, which are connected by means of the truncated triangular blades 26, disposed with their minor ends against the hubs and their major ends against the inner face of the band, and the blades of the lowermost wheel are disposed to incline in one direction, while the blades of the wheel next above are disposed to incline in the opposite direction. The blades of the third wheel 22 incline in the same direction with those of the bottom wheel 20, and the blades of the top wheel 23 incline in the direction of the second wheel 21. Thus if the shaft 17 be rotated in the proper direction wheel 20 will force water downwardly, wheel 21 will lift water, wheel 22 will force water downwardly, and wheel 23 will lift water, the thrust of the wheels being alternately in opposite directions, and as each wheel operates upon a column of water equal to the column operated upon by every other wheel the thrust of the wheels 20 and 22 is neutralized or balanced by the thrust of wheels 21 and 23, so that the effective thrust is practically zero and longitudinal displacement of the shaft is prevented. To rotate the shaft 17, it is provided with a pulley-wheel 27 at its upper end for engagement by a driving-belt, and as it is rotated the water is alternately lifted and pushed through the several inlet-openings and finally flows from the outlet of the uppermost chamber.

In installing the pump the lower end of the barrel is disposed in the water so that the water will flow into the inlet of the lowermost chamber, it being understood that the pump may be used for raising water from a stream, as illustrated, or may be used for raising water from a well or other source of supply.

In practice modifications of the specific construction shown may be made and any suitable materials and proportions may be used for the various parts without departing from the spirit of the invention.

It will be understood that in practice any suitable number of chambers may be used with their corresponding wheels, depending upon the depth of the well and other working conditions, and that the separation of the wheels may be changed; also, that other modifications of the specific construction shown may be made and any suitable materials and proportions may be used for the various parts without departing from the spirit of the invention.

What is claimed is—

1. A vertically-arranged pumping device comprising in combination, a continuous barrel or pumping-channel having a water-inlet at its lower end and a discharge-outlet at its upper end, said pumping-channel being provided with a series of superposed chambers into which the water is forced alternately in opposite directions, there being between said chambers alining openings arranged in the same vertical plane, a shaft extending centrally through all of said openings, and pumping-wheels secured to the shaft and disposed one in each of said openings, the blades of alternate wheels being oppositely inclined and adapted to force the water alternately in opposite directions to maintain a constant flow in one direction in the barrel or pumping-channel, substantially as specified.

2. A pumping device comprising in combination, a lower chamber 5 having an inlet 9 arranged for the passage of water downwardly into said chamber, a chamber 6 above the chamber 5 and having an inlet-opening 10 for the upward flow of water, a chamber 7 arranged partly above and partly to one side of chamber 6 and having an inlet-opening for the entrance of water in a downward direction, a chamber 8 above the chamber 7 and having an inlet-opening for the upward flow of water and a final discharge-opening, the whole forming a continuous pumping channel or barrel, a shaft passing through all of the openings, a series of bladed pumping-wheels secured to said shaft at the various openings, the blades of alternate wheels being inclined in opposite directions and adapted to force the water alternately in opposite directions to maintain a constant flow in one direction in a pump barrel or channel.

In testimony that I claim the foregoing as my own I have hereto affixed my signature in the presence of two witnesses.

JOSHEPH W. BAKER.

Witnesses:
F. C. BAKER,
B. A. BROWN.